Oct. 31, 1939.  N. B. STONE  2,178,502
WHEEL RIM
Filed June 21, 1938

Inventor
N. B. Stone
By A. D. Adams
Attorney

Patented Oct. 31, 1939

2,178,502

UNITED STATES PATENT OFFICE 2,178,502

WHEEL RIM

Nathaniel B. Stone, Washington, D. C.

Application June 21, 1938, Serial No. 214,997

4 Claims. (Cl. 152—407)

This invention relates to automobile wheel rims and, among other objects, aims to provide a greatly simplified and safe, dependable self-locking expansible ring flange adapted to hold a tire in place on the rim and having provision to prevent it from unlocking due to a flat tire or other causes. Another object of the invention is to provide a spring flange of this type having graduated spring resistance to enable it to be opened or expanded very easily and cause it to remain substantially circular. The idea is to provide a quick detachable ring flange which can be applied to an ordinary rim without any lateral distortion and which can be manufactured at a relatively low cost.

Other aims and advantages of the invention will appear in the specification, when considered in connection with the accompanying drawing, wherein.

Figure 1:
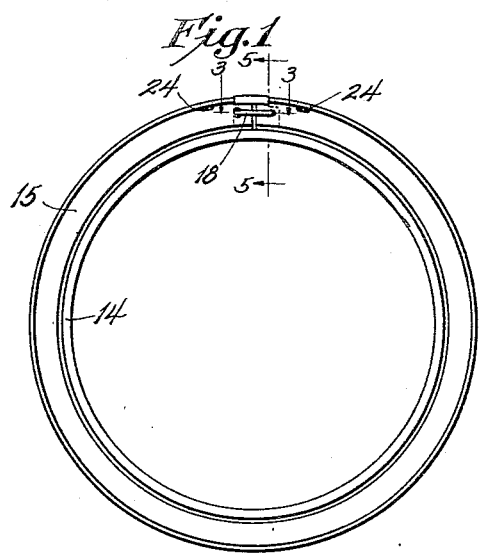
Fig. 1 is a side elevation of a wheel rim having a locking flange embodying the invention.
Figure 2:
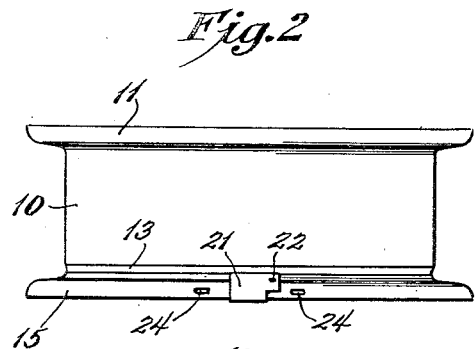
Fig. 2 is a top plan view of the wheel rim.
Figure 3:
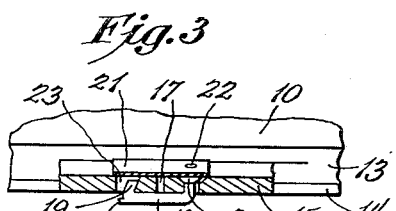
Fig. 3 is an enlarged sectional view taken on the line 3—3 of Fig. 1.

Referring particularly to the drawing, the wheel rim there shown is of the flat center type. It has a main rim section 10 presenting an inside integral flange 11 to engage the inside wall of a tire 12 which is slipped on the open outside of the rim. At the outer edge of the rim there is shown a shallow substantially annular seat 13 having a conical bottom and presenting a locking rib 14, the top edge of which is substantially flush with the outer surface of the flat rim portion 10 so that both beads of the tire 12 may easily be slipped over the rim.

Figure 4:
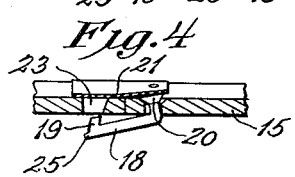
Fig. 4 is a similar view showing the locking member disengaged.
Figure 5:
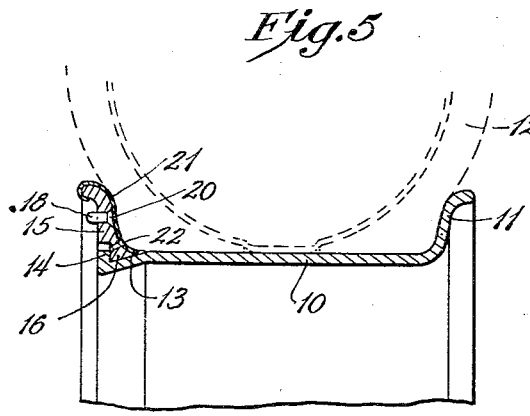
Fig. 5 is a cross section taken on the line 5—5 of Fig. 1.
Figure 6:
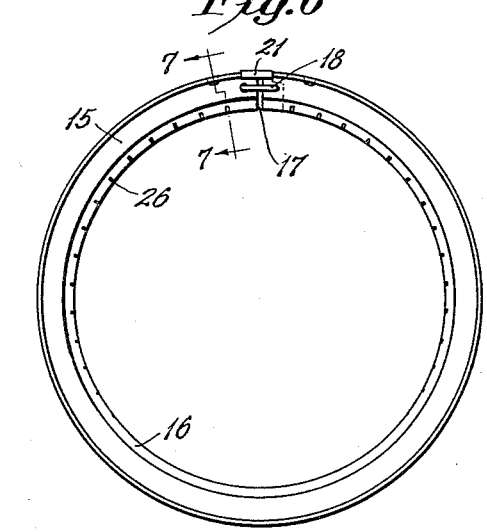
Fig. 6 is a side elevation of the ring flange alone.
Figure 7:
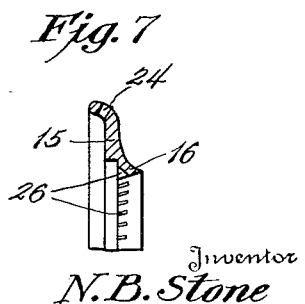
Fig. 7 is a sectional view taken on the line 7—7 of Fig. 6.

In this instance, a self-locking ring in the form of a split flange 15 preferably shaped like the integral flange 11 has an annular tongue 16 to engage the annular groove 13 and be locked therein against the inside edge of the rib flange 14. It is made of spring steel or other metal and presents a narrow gap 17 between its ends to permit it to be slightly contracted when it is to be unlocked from the main rim section. It is adapted to be expanded and slipped over the rib 14 and contracts automatically to engage the seat. In this instance, one end portion of the ring carries a locking member in the form of a U-shaped bar 18 having a hook 19 at one end and a head 20 at the other end seated in a countersunk opening in one end portion of the ring. The head 20 has a flattened inner face and is held in place by a leaf spring 21 secured by a rivet 22 or other suitable means to the inner face of the ring below the head. The spring is shown as being curved to conform to the contour of the inside face of the ring, being bent over the outer flange edge. The arrangement is such that it tends to hold the locking member in its normal locking position and has to be distorted or bent inwardly when the locking member is swung outwardly, as shown in Fig. 4, to disengage it from a complemental opening 23 in the other end portion of the ring. Incidentally, the opening 23 is enlarged or flared inwardly to present a lip at its locking edge and the hooked end 19 is bent toward the gap in the ring flange so that it cannot be accidentally disengaged. When the two ring ends are pulled together by an ordinary tool, which may be engaged in notches or openings 24 at the upper edges of the two end portions of the ring, the hook will snap into place and hold the ring locked in place. When a tire is thus locked on the rim, the bead will serve to exert pressure on the leaf spring and insure firm locking engagement of the hook with the opposite ring end, even though the tire may blow out and it can never become disengaged unless the ring ends are again pulled together and a prying tool of any type is used to lift the hook end 19 out of its locking opening 23. For this purpose, the hook end may have a small projection 25 to be engaged by the bit of a screw driver or the blade of a pocket knife when the two ends are squeezed together. Incidentally, the leaf spring is shown as overlapping the gap between the two ends and the ring flange 15 to prevent injury of the tire at the gap. Also, the curled over edge of it serves to guide the two ring ends straight together when they are contracted to the locking position.

To enable the ring to expand evenly in substantially circular form and be removed very quickly from its groove in the rim section, the inner edge is shown as having a series of saw cuts or kerfs 26 of progressively decreasing depth from the split ends toward the diametrically opposite portion of the ring. These graduated kerfs impart to the ring a gradually increasing resistance to expansion from the split ends toward the opposite side so that the ring will be fully disengaged from the rim by only slightly expanding the split ends. Moreover, it requires much less force or power to expand a relatively heavy ring.

From the foregoing description, it will be seen that the improved self-locking rim is very simple in its construction, easy to manufacture and absolutely safe in operation. The ring positively engages the rim section and the action of the tire bead on the ring serves to keep it locked and supplements the action of the spring in holding the locking member in place. It is easy to apply and remove with ordinary tools.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a tire rim of the class described, a split expansible ring flange having an annular tongue to engage the rim; a locking hook member movably mounted in one end of said ring flange; a hook receiving opening in combination with the other end of the ring flange; and a flat leaf spring secured to the inner face of the ring flange adjacent to the connections of the hook member and acting on the hook member to bias it to locking position both by the spring action and by tire pressure.

2. In combination with a tire rim of the class described, a split expansible ring flange having an annular tongue interlocking with said rim; a locking hook member movably mounted in one end of said ring flange; a hook receiving opening in the other end of the ring flange; and spring means on the inside of the ring flange connected to bias the locking member to its locking position and also arranged to utilize the tire pressure to hold the hook member in locking engagement.

3. In an automobile wheel rim of the class described, a main rim portion having an annular seat at its outer tire receiving end; and a split tire retaining ring flange adapted to be locked in said seat and having graduated spring resistance gradually increasing in strength from the split ends whereby a heavy ring may be expanded by applying a relatively small force and will remain in substantially true circular form when expanded to be disengaged from the main rim portion.

4. In combination with an automobile wheel rim of the class described, a split tire retaining ring flange adapted to be locked on the rim and having a series of spaced transverse kerfs in the inner edge of the ring beginning at the split ends to graduate the spring resistance so that the ring flange may be expanded with the minimum effort and will remain in substantially true circular form.

NATHANIEL B. STONE.